Figure 6:

March 10, 1959    C. B. GEORGE ET AL    2,877,085
CORROSION INHIBITING THIOL COMBINATION
Filed Feb. 27, 1956

INVENTOR.
Charles B. George
William Tangola
BY H. Lewis Kahler

United States Patent Office 2,877,085
Patented Mar. 10, 1959

2,877,085

CORROSION INHIBITING THIOL COMBINATION

Charles B. George, Philadelphia, William A. Tanzola, Havertown, and Harry Lewis Kahler, Feasterville, Pa., assignors, by mesne assignments, to Betz Laboratories, Inc., a corporation of Pennsylvania Application February 27, 1956, Serial No. 568,004

6 Claims. (Cl. 21—2.7)

The present invention relates to new and improved corrosion inhibiting compositions and new and improved methods of inhibiting corrosion. The new compositions and methods are especially useful and effective in inhibiting and preventing corrosion of metal in systems where a metallic surface such as steel or a non-ferrous alloy is in contact with a corrosive industrial water or aqueous solution. Common examples in which such conditions are encountered are the cooling water systems for air conditioning, engine jackets, heat exchangers, condensers, cooling towers, and the respective disrtibution equipment involved.

In operations in which cooling water is employed, the control of corrosion of metallic parts of the system is extremely important. The factors which influence the degree of corrosivity of the metal in the aqueous solution, including temperature, water flow, ion composition, oxygen saturation and the like, are so varied that the problems of combating such corrosion are quite complex. No single method or material is equal to the task in all cases and numerous treatments are required to combat the corrosion encountered under various special conditions.

While various materials have been used to inhibit the corrosion of metal in contact with cooling water, the outstanding materials have been chromates and phosphates. Such compounds have come into widespread use. When properly applied, the chromates are unequalled in their ability to prevent metal loss. However, the chromates, except at very high concentrations, are not capable of eliminating dangerous pitting attack. Furthermore the chromates are unfortunately highly toxic, and this feature becomes of increasing concern both from the standpoint of the health of operating personnel and also because of the problem of disposal into public water systems and streams.

While the phosphates, both orthophosphates and polyphosphates, do not aqual the chromates in metal saving power, they have a diverse and widespread use in preventing corrosion chiefly because they are non-toxic and of relatively low cost. The phosphates have not, however, been particularly successful in cooling systems. The variations in temperature, flow, pH, and ion load in such systems are so great that the phosphates in normal usage have often been inadequate to meet the corrosion load. Due to the reversion of polyphosphates to orthophosphates and the low solubility of tricalcium phosphate which is likely to form, it has not been possible in many cases to use adequate concentrations of phosphates. Efforts have been made to improve the protective powers of the phosphates by the synergistic action of additive compounds such as cyanides, cyanates, manganates, zinc, silicates, organic materials and the like. In general these methods, while improving on the properties of phosphates alone, have been only conditionally successful in providing greater metal saving or eliminating the inherent tendency of phosphates to permit pitting. Phosphates have been used with chromates as shown in Kahler, U. S. Patent 2,711,391, granted June 21, 1955, for Phosphate-Chromate Corrosion Protection in Water Systems, and these have been very successful in use in cooling water equipment to inhibit metal loss in several years of test.

A purpose of the present invention is to provide a new and improved composition for inhibiting corrosion.

A further purpose is to provide a new and improved combination of chemicals to prevent or restrain the corrosive effects of cooling water on ferrous and non-ferrous metals in contact with the water.

A further purpose is to increase the power of a composition containing a phosphate to inhibit corrosion by the synergistic addition to the phosphate of an organic thiol, and zinc ion, preferably in a concentration of 1 to 100 p. p. m. of phosphate compound as $PO_4$, including more than 1 p. p. m. of water soluble polyphosphate compound as $PO_4$, and preferably with more than 1 p. p. m. of water soluble orthophosphate compound as $PO_4$, along wtih 0.5 to 20 p. p. m. and preferably 0.5 to 10 p. p. m. of zinc ion and 0.5 to 20 p. p. m. and preferably 0.5 to 10 p. p. m. of the organic thiol, at a pH of 5 to 8.5.

A further purpose is to improve the corrosion characteristics of process water contaminated by mercaptan by adding zinc ion and water soluble phosphate compound including water soluble polyphosphate compound.

Further purposes appear in the specification and in the claims.

In the drawings Figures 1 to 6 show test strips useful in describing the invention.

In accordance with the present invention, it has been discovered that new and improved corrosion inhibitory compositions can be formulated by combining a water soluble phosphate including a polyphosphate, a water soluble zinc compound and an organic thiol, that is, a compound having the thiol group, and free from groups of the class consisting of carboxyl and halogen. The thiol should have from 2 to 12 carbon atoms in the molecule and should have a minimum molecular weight of 62.

As an example, an excellent corrosion protecting composition can be secured by introducing into the water 20 p. p. m. of sodium tripolyphospate, 20 p. p. m. of disodium phosphate, 2.4 p. p. m. of isopropyl thiol and 2.0 p. p. m. of zinc ion.

Another very effective composition, given by way of example, is a water containing 10 p. p. m. of sodium tripolyphosphate, 10 p. p. m. of disodium phosphate, 2.4 p. p. m. of 2-benzothiozolethiol and 2.0 p. p. m. of zinc ion.

The above compositions, and others within the scope of the invention, can be used in making an industrial water non-corrosive with respect to ferrous metals and alloys such as steel, and iron, and also non-ferrous metals and alloys such as copper, copper base alloys, aluminum and aluminum base alloys.

Each of the materials used in the corrosion inhibitory composition of the present invention exhibits some measure of inhibitory power with respect to the corrosion of metal by water. Phosphates may be used subject to limitations as set forth above. Zinc in some instances exerts an inhibitory power by itself, but this is insufficient to provide satisfactory protection against corrosion.

Thioalcohols have been used as corrosion inhibitors in acid pickling, radiator coolants, hydraulic liquids and petroleum well treatments. However, in such treatments their concentration relative to the water phase is quite high and it would be impractical to use any such concentration in cooling towers and other uses as contemplated by the present invention.

We find that these materials can be used collectively in very small concentrations to provide exceptional corrosion protecting power which is not exhibited by any one or two of the materials. This power is unique in that mere extension of known and disclosed materials and techniques to treatment of cooling water applications such as cooling towers would not achieve any such results. The new effect is attributed to the presence of all of the ingredients, but zinc is entitled to a special importance because of its apparently great contribution to the result.

The composition would appear to operate by forming a protective coating on the metal surfaces. This protective coating is visible to the eye and acts as an effective barrier against the corrosive elements in the water. The coating is sufficiently thin so that it is not objectionable from the standpoint of pipe blockage or heat transfer efficiency and it is quite adherent to the metal surfaces and provides a corrosion resisting coating on the metal.

Table I shows the results obtained by exposing high carbon steel specimens having a surface ground to 20 micro-inches. The chemical composition of the steel was 0.04 percent sulphur, 0.3 percent silicon, 0.9 percent carbon, 1.4 percent manganese, phosphorus absent. The percentages are by weight. The water used for the test was a Philadelphia city tap water containing 100 p. p. m. calcium, 30 p. p. m. magnesium, 30 p. p. m. alkalinity all as calcium carbonate, 40 p. p. m. sulphate, 5.5 p. p. m. oxygen and 500 p. p. m. chloride ion. The chloride ion content was deliberately increased as above to increase the corrosivity. The temperature of test was 120° F.

As shown, the table shows additions of sodium tripolyphosphate, an example of a polyphosphate used in some of the tests, disodium phosphate, an example of an orthophosphate, used in other tests, thioalcohol or thiol used in various tests sometimes as 2-benzothiazole thiol, and sometimes as 2-propane thiol, zinc fed as zinc sulphate, average penetration in thousandths of an inch per year and a summary of the corrosion behavior.

The average penetration values in mils or thousandths of an inch per year were secured through the exposure of the test specimens. The evaluation of the corrosion behavior was made on the basis of the loss of metal as shown by the average penetration value and also by taking into consideration factors evident from examination of the test specimens such as formation or lack of formation of a protective coating, continuity of the protective coating, adherence of the coating, presence or absence of pitting and the like. The corrosion behavior as listed in the table therefore is a composite of various factors which indicate satisfactory or poor results.

Table I, test 1, indicates that the thioalcohol offered no protection when used alone in a concentration of 2.4 p. p. m. Test 2 indicates that the thioalcohol in a concentration of 2.4 p. p. m. with 5 p. p. m. of orthophosphate slightly improved the results but corrosion protection was still very poor. Test 3 indicates that poor results were also obtained with the thioalcohol, polyphosphate and orthophosphate, but without zinc.

On the other hand, in test 5, with the thioalcohol, orthophosphate, polyphosphate and zinc, excellent results were obtained.

Table I, test 6, shows that increasing the orthophosphate without polyphosphate, but with thioalcohol and zinc gave poor results. Test 7 shows that polyphosphate and orthophosphate with zinc, even in the higher level of concentration of the phosphates, but without the thioalcohol was not satisfactory.

Test 8 shows that the absence of orthophosphate detracts from the results.

Test 9 indicates that the use of the thioalcohol with zinc but without the phosphate was not satisfactory.

Test 10 shows that higher concentrations of polyphosphate and orthophosphate with another thioalcohol, but in the absence of zinc, gave poor results.

Test 11 shows that the inclusion of zinc again gave excellent results.

All of these tests were performed at pH 6 and other tests were successfully carried out at pH 7.0 and 7.8.

A research program was carried out investigating various other compositions and combinations of inhibitors to determine whether agents other than phosphate, zinc and thioalcohols would be satisfactory in a corrosion inhibitor composition of this character. For example, this program tested thioalcohol and zinc with other corrosion inhibitors such as sodium fluoride and sodium citrate instead of phosphate. The results were poor as the average penetration values were high and the corrosion protection was unsatisfactory. Other metallic ions were tested instead of zinc along with phosphate and thioalcohols. Fair results were obtained with cadmium, but the results with nickel, cobalt, aluminum and chromium were poor.

In accordance with the present invention, the polyphosphate may be any water soluble polyphosphate or molecularly dehydrated phosphate such as sodium pyrophosphate, sodium tripolyphosphate, sodium tetraphosphate, sodium septaphosphate, sodium decaphosphate, sodium hexametaphosphate or the corresponding potassium salts or the molecularly dehydrated phosphoric acids such as metaphosphoric acid or pyrophosphoric acid. Any molecularly dehydrated phosphate having an $Na_2O:P_2O_5$ ratio from 1:1 to 2:1 can be used.

In some systems orthophosphate can be supplied by reversion of polyphosphate. Where necessary, however, it is possible to feed orthophosphate, usually as sodium, potassium or ammonium phosphate. Examples are monosodium phosphate, disodium phosphate, trisodium phosphate and phosphoric acid.

It will be evident that in the case of materials which are either strongly acidic or strongly basic, it will be necessary to adjust the pH to keep it in a range of between 5 and 8.5, in which the process is operative.

The zinc ions may be supplied by any water soluble zinc salt which produces ions in necessary concentration, suitable examples being zinc chloride, zinc sulphate, sodium zincate, and the like.

The thiol will be any organic compound having an active thiol or SH group or a group in which the hydrogen of the thiol has been substituted as by sodium, potassium or the like. The remainder of the molecule may be a carbon ring such as the benzene ring or a carbon chain, having from 2 to 12 carbon atoms, with or without nitrogen, oxygen and/or additional sulphur. The molecular weight may be as low as 62.

The configuration of the carbon nucleus along with the nitrogen, oxygen and sulphur, if any, may be any configuration which possesses a thiol group. It is important, however, that the compound should not contain a carboxyl group or a halogen group such as chlorine, as these interfere with the protective effect.

Our experiments indicate that phosphate compound concentrations may be in the range from 1 p. p. m. to 100 p. p. m. as $PO_4$, preferably 5 to 50 p. p. m. There should be at least 1 p. p. m. of water soluble polyphosphate compound and preferably also at least 1 p. p. m. of water soluble orthophosphate compound both expressed as $PO_4$.

The concentration of the water soluble thiol should be in the range from 0.5 to 20 p. p. m. and preferably 1 to 10 p. p. m.

The concentration of zinc ion should be in the range from 0.5 to 20 p. p. m. and preferably 1 to 10 p. p. m.

The materials can be used effectively in any ratio within the concentration range, although of course in meeting particular conditions particular desired ratios may be used.

The protective action is effective in a pH range of 5.0 to 8.5 and preferably from 5.5 to 8.0.

It will of course be evident that any composition may be used which will introduce the desired concentration of zinc ion, thiol and phosphate compound in the treated water.

Tests have been made of various thiol compounds to determine the character of thiol which exhibits proper protective properties.

Table II illustrates various sulphur compounds and the concentrations fed, along with the concentrations of sodium tripolyphosphate, and disodium phosphate, and of zinc ion if any. The last columns give the metal loss in milligrams per day, the character of coating if any, and the corrosion behavior.

Table II, tests 1, 2, 3, 4, 5 and 6, shows that unsatisfactory results were obtained even with polyphosphate and orthophosphate and with or without zinc, when an active thiol group was absent. It will be noted that in benzothiazol, although sulfur is present, the SH group is absent and the compound is not effective. Tests 7, 8, 9, 10, 11, 12 and 13 show that where the thiol group was present, the results were satisfactory from the standpoint of coating and corrosion protection where zinc was present but not otherwise.

Tests 15, 16, 17, 18, 19 and 20 show that poor results were obtained in the presence of a thiol group when the corrosion protection was prevented by another active group, which was carboxyl in tests 15 and 16 and a halogen such as chlorine in tests 17 to 20. Other halogens have the same effect.

In order to permit study of the results, the drawing shows six corrosion specimens illustrative of the effects obtained.

Figure 2:
Figure 1:

At the left Figures 1 and 2 (S1044 and S1016) show the results of tests 5 and 6 of Table II on high carbon steel specimens described above when the water composition included an organic sulphur compound lacking a thiol group. S1044 illustrates failure of the protection with zinc and S1016 illustrates the failure of the protection without zinc. In the test with zinc there were well defined pits under the tubercles in a lower right section of the specimen. The specimen without zinc had numerous small well defined tubercles that are clearly evident.

Figure 5:
Figure 4:
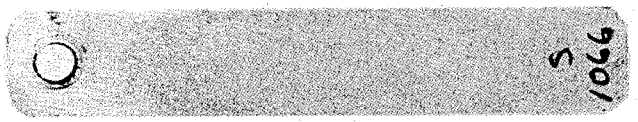
Figure 3:
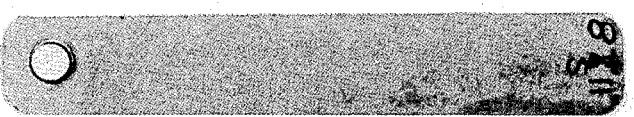

The remaining specimens were treated with a water composition including sulphur compounds having a thiol group. Figures 3 and 4 (S1138 and S1066) were the specimens in Table II, tests 11 and 12, using 2-propane thiol. The test with zinc, Figure 3, S1138 was successful and the test without zinc, Figure 4, S1066, was unsatisfactory. Figure 5, S1340 used sodium dibutyl dithio carbamate (Table II, test 7) with zinc and was successful, while Figure 6, S1342 showing the result without zinc (Table II, test 8) was a failure.

Based upon the information available, it would seem that the phosphate-thiol-zinc treatment deposits coatings which are not dependent on the corrosion process of the metals involved. The coatings are deposited on glass, rubber, etc. as well as on metal and metal compounds.

The effects of hydrogen sulphide, chlorine and chloramines on the combination of the invention have been determined. Hydrogen sulphide and sulphides contaminate many types of cooling waters. Hydrogen sulphide at even low residuals of 1 p. p. m. was injurious to the treatment and eliminated the coatings with resultant pitting and loss of metal, so that the treatment of the invention is not recommended for waters containing hydrogen sulphide. Chlorine is commonly used as an algicide and slimicide. Chlorine and chloramines in low residuals of 1 to 2 p. p. m. eliminated the coating deposit and offset the benefits of the phosphate-thiol-zinc treatment, so that this treatment is not recommended in waters containing chlorine or chloramines.

In view of our invention and disclosure variations and modifications to meet individual whim or particular need will doubtless become evident to others skilled in the art, to obtain all or part of the benefits of our invention without copying the process and apparatus shown, and we, therefore, claim all such insofar as they fall within the reasonable spirit and scope of our claims.

*Table I* pH6

| Test No. | Sodium tripoly-phosphate, p. p. m. | Di-sodium phosphate, p. p. m. | Thio alcohol,[1] p. p. m. | $Zn^{++}$, p. p. m. | Ave. penetration, mils/yr. | Corrosion behavior |
|---|---|---|---|---|---|---|
| 1 | | | 2.4 | | 120 | Poor. |
| 2 | | 5 | 2.4 | | 73 | Do. |
| 3 | | 5 | 2.4 | 2.0 | 37 | Do. |
| 4 | 5 | 5 | 2.4 | | 52 | Do. |
| 5 | 5 | 5 | 2.4 | 2.0 | 5 | Excellent. |
| 6 | | 10 | 2.4 | 2.0 | 26 | Poor. |
| 7 | 10 | 10 | 0 | 2.0 | 22 | Do. |
| 8 | 10 | 0 | 2.4 | 2.0 | 15 | Fair. |
| 9 | | | 2.4 | 2.0 | 62 | Poor. |
| 10 | 20 | 20 | 2.4 | | 39 | Do. |
| 11 | 20 | 20 | 2.4 | 2.0 | 7 | Excellent. |

[1] NOTE.—Tests 1-6 and 8-9 used 2-benzothiazol thiol. Tests 10 and 11 used 2-propane thiol.

*Table II* pH6

| Test No. | Compound, p. p. m. | Structure | Sodium tripoly phosphate, p. p. m. | Disodium phosphate, p. p. m. | Zinc p. p. m. | Metal loss, mg./day | Coating | Corrosion behavior |
|---|---|---|---|---|---|---|---|---|
| 1 | Dibenzothiazyl disulfide, 2.4 | | 20 | 20 | 2 | 31 | None | Poor. |
| 2 | do | | 20 | 20 | | 35 | do | Do. |
| 3 | Benzothiazole, 2.4 | | 20 | 20 | 2 | 28 | do | Do. |
| 4 | do | | 20 | 20 | | 23 | do | Do. |

*Table II—Continued*

| Test No. | Compound, p. p. m. | Structure | Sodium tripoly phosphate, p. p. m. | Disodium phosphate, p. p. m. | Zinc p. p. m. | Metal loss, mg./day | Coating | Corrosion behavior |
|---|---|---|---|---|---|---|---|---|
| 5 | Piperidinum penta-methylene dithio carbamate, 2.4. | (structure) | 20 | 20 | 2 | 16 | Poor | Poor. |
| 6 | ......do...... | (structure) | 20 | 20 | | 24 | ...do...... | Do. |
| 7 | Sodium dibutyl dithio carbamate, 2.4. | $Na-S-C(=S)-N(C_4H_9)_2$ | 20 | 20 | 2 | 8 | Thin | Good. |
| 8 | ......do...... | $Na-S-C(=S)-N(C_4H_9)_2$ | 20 | 20 | | 40 | None | Poor. |
| 9 | 2-benzothiazolthiol, 2.4 | (structure) | 5 | 5 | 2 | 5 | Good | Excellent. |
| 10 | ......do...... | (structure) | 5 | 5 | | 52 | None | Poor. |
| 11 | 2-propanethiol, 2.4 | $(H_3C)_2CH-SH$ | 20 | 20 | 2 | 7 | Good | Excellent. |
| 12 | ......do...... | $(H_3C)_2CH-SH$ | 20 | 20 | | 39 | None | Poor. |
| 13 | Benzenethiol, 2.4 | (C₆H₅-SH) | 20 | 20 | 2 | 12 | Good | Good. |
| 14 | ......do...... | (C₆H₅-SH) | 20 | 20 | | 28 | Poor | Poor. |
| 15 | Thioglycollic acid, 2.4 | $HS-CH_2COOH$ | 20 | 20 | 2 | 33 | ...do...... | Do. |
| 16 | ......do...... | $HS-CH_2COOH$ | 20 | 20 | | 30 | ...do...... | Do. |
| 17 | Parachlor thiophenol, 2.4 | (structure) | 20 | 20 | 2 | 24 | ...do...... | Do. |
| 18 | ......do...... | (structure) | 20 | 20 | | 48 | ...do...... | Do. |
| 19 | Pentachloro thiophenol, 2.4 | (structure) | 20 | 20 | 2 | 34 | ...do...... | Do. |
| 20 | ......do...... | (structure) | 20 | 20 | | 77 | ...do...... | Do. |

Having thus described our invention what we claim as new and desire to secure by Letters Patent is:

1. The process of treating a cooling water which is maintained in contact with metallic surfaces to inhibit corrosion, which comprises adding to the water between 0.5 and 20 p. p. m. of thiol of the class consisting of 2-benzothiazole thiol, 2-propane thiol, benzene thiol, and sodium dibutyl dithio carbamate, adding to the water between 0.5 and 20 p. p. m. calculated as zinc ion of water soluble zinc compound, and adding to the water between 1 and 100 p. p. m. calculated as $PO_4$ of water soluble polyphosphate compound, and maintaining in the water a pH in the range between 5 and 8.5.

2. The process of claim 1, in which the water soluble phosphate includes at least 1 p. p. m. of water soluble orthophosphate compound calculated as $PO_4$.

3. The process of claim 1, in which the water soluble thiol includes 2-propane thiol.

4. The process of claim 1, in which the water soluble thiol includes 2-benzothiazole thiol.

5. The process of claim 1, in which the water soluble Brewster: "Organic Chemistry," N. Y., Prentice-Hall, 6. The process of claim 1, in which the water soluble thiol includes sodium dibutyl dithiol carbamate.

References Cited in the file of this patent

UNITED STATES PATENTS

| | | |
|---|---|---|
| 2,046,242 | Bertsch | June 30, 1936 |
| 2,067,628 | Fiske | Jan. 12, 1937 |
| 2,194,491 | Bird | Mar. 26, 1940 |
| 2,332,209 | Enquist | Oct. 19, 1943 |
| 2,499,261 | Rosenbloom | Feb. 28, 1950 |
| 2,524,484 | Smith | Oct. 3, 1950 |
| 2,624,708 | Langer et al. | Jan. 6, 1953 |

OTHER REFERENCES

Brewster: "Organic Chemistry," N. Y., Prentice-Hall, 1948, p. 293.

UNITED STATES PATENT OFFICE

CERTIFICATE OF CORRECTION

Patent No. 2,877,085                                    March 10, 1959

Charles B. George et al.

It is hereby certified that error appears in the printed specification of the above numbered patent requiring correction and that the said Letters Patent should read as corrected below.

Column 10, line 2, strike out "Brewster: "Organic Chemistry," N. Y., Prentice-Hall," and insert instead -- thiol includes benzene thiol. --.

Signed and sealed this 1st day of September 1959.

(SEAL)

Attest:

KARL H. AXLINE
Attesting Officer

ROBERT C. WATSON
Commissioner of Patents